United States Patent
Kim

(10) Patent No.: US 9,031,252 B2
(45) Date of Patent: May 12, 2015

(54) HEADPHONES WITH TOUCH INPUT UNIT, AND MOBILE DEVICE ALLOWING FOR THE CONNECTION TO THE HEADPHONES

(75) Inventor: Jae Kyung Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 13/408,104

(22) Filed: Feb. 29, 2012

(65) Prior Publication Data

US 2012/0224730 A1    Sep. 6, 2012

(30) Foreign Application Priority Data

Mar. 2, 2011 (KR) ........................ 10-2011-0018587

(51) Int. Cl.
*H04R 1/10* (2006.01)
*H04R 5/02* (2006.01)
*H04M 1/00* (2006.01)
*H04M 1/60* (2006.01)

(52) U.S. Cl.
CPC ............ *H04R 1/1041* (2013.01); *H04M 1/6058* (2013.01); *H01H 2201/036* (2013.01); *H04M 2250/22* (2013.01); *H04R 2201/107* (2013.01); *H04R 2420/05* (2013.01); *H04R 2420/09* (2013.01)

(58) Field of Classification Search
CPC ............ H04R 1/1041; H04R 2420/09; H04R 2420/05; H04M 1/6058
USPC ............... 381/74, 77, 309; 338/118; 323/370, 323/354; 455/575.2, 569.1
See application file for complete search history.

(56) References Cited

U.S. PATENT DOCUMENTS

| | | | |
|---|---|---|---|
| 4,764,717 A * | 8/1988 | Tucker et al. | ................. 323/364 |
| 6,690,362 B1 | 2/2004 | Motoyama et al. | |
| 6,984,990 B2 * | 1/2006 | Shin | ............................. 324/538 |
| 2006/0215847 A1* | 9/2006 | Hollemans et al. | ............. 381/74 |
| 2008/0032753 A1 | 2/2008 | Nho | |
| 2008/0130910 A1 | 6/2008 | Jobling et al. | |
| 2009/0124286 A1 | 5/2009 | Hellfalk et al. | |
| 2009/0136058 A1* | 5/2009 | Choi et al. | ....................... 381/74 |
| 2009/0179768 A1 | 7/2009 | Sander et al. | |

FOREIGN PATENT DOCUMENTS

EP    1 087 415 A1    3/2001
JP    2006-33150    2/2006

OTHER PUBLICATIONS

Downs, "Using resistive touch screens for human-machine interface", 2005, Texas Instruments Corp.*

* cited by examiner

*Primary Examiner* — Vivian Chin
*Assistant Examiner* — David Ton
(74) *Attorney, Agent, or Firm* — Jefferson IP Law, LLP

(57) ABSTRACT

A headphones apparatus with a touch input unit, and a mobile device for connecting to the headphones are provided. The apparatus includes a microphone for receiving audio signals, a left loudspeaker for outputting a left audio signal, a right loudspeaker for outputting a right audio signal, a touch input unit for receiving a user's operating signals to control a mobile device, and a plug. The plug includes a sensing contact for transmitting the operating signals from the touch input unit to the mobile device, a microphone contact connected to the microphone for supplying bias voltage to the microphone, a left audio contact connected to the left loudspeaker, a right audio contact connect to the right loudspeaker, and a ground contact.

19 Claims, 4 Drawing Sheets

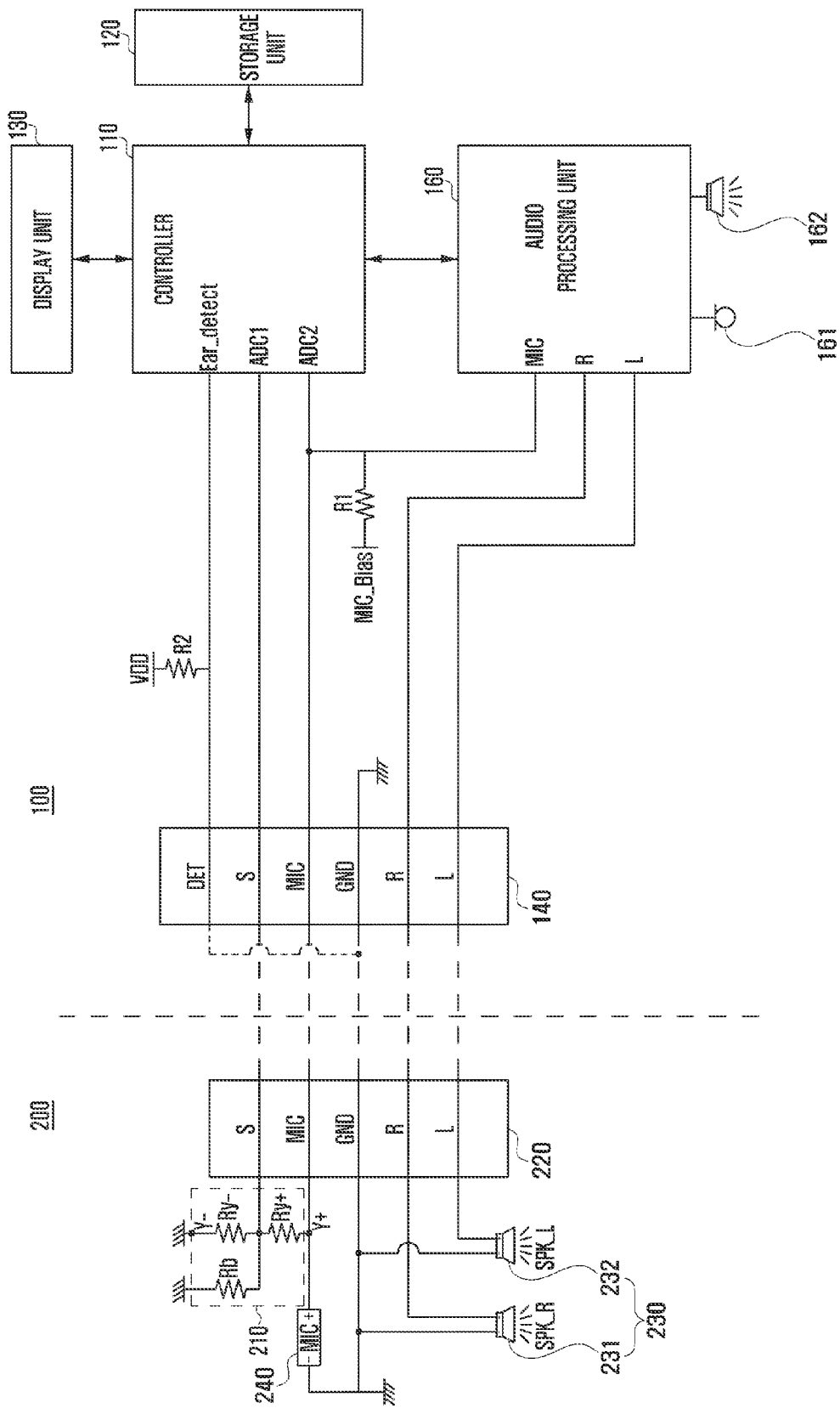

HEADPHONES WITH TOUCH INPUT UNIT, AND MOBILE DEVICE ALLOWING FOR THE CONNECTION TO THE HEADPHONES

PRIORITY

This application claims the benefit under 35 U.S.C. §119 (a) of a Korean patent application filed on Mar. 2, 2011 in the Korean Intellectual Property Office and assigned Serial No. 10-2011-0018587, the entire disclosure of which is hereby incorporated by reference.

BACKGROUND OF THE INVENTION

1. Field of the Invention

The present invention relates to headphones and systems connected to the headphones. More particularly, the present invention relates to headphones with a touch input unit that is designed to detect a one-dimensional coordinate via only one Indium Tin Oxide (ITO) film. The invention is also related to a mobile device that allows for the connection of the headphones.

2. Description of the Related Art

With the rapid development of information and communication technology and semiconductor technology, the use of various types of mobile devices has rapidly increased. Mobile devices employ mobile convergence to provide additional services provided by other types of mobile systems in addition to traditional services. For example, mobile devices generally include the usual communication functions such as voice calling or message transmission, and additional functions such as a TV viewing function (e.g., mobile broadcasting, such as Digital Multimedia Broadcasting (DMB), Digital Video Broadcasting (DVB), etc.), an audio playback function (e.g., MEPG Audio Layer 3 (MP3)), a photographing function, a data communication function, an Internet function, a short-range RF communication function, etc.

Mobile device users can use headphones to listen to music or audio while the mobile device reproduces audio files or broadcasts. Mobile devices of the related art generally allow for the connection of various types of headphones. For example, mobile devices allow for the connection of headphones that have varying configurations, such as 10-pole, 20-pole, etc., according to the mobile device manufactures. In recent years, mobile devices have been equipped with ear jacks supporting headphones with a Φ 3.5 mm 4-pole plug. Accordingly, 4-pole headphones have also been developed to include a button type operating unit such as a volume adjusting key, a call key, etc. When a button key is operated in the button type operation unit of 4-pole headphones, an event occurs such that a level of voltage output to a particular contact (e.g., a microphone contact) has a high degree of variation. To resolve the high degree of variation, conventional 4-pole headphones are configured in such a way that the respective contacts are connected with resistors having different resistances, and such that the microphone contact is connected to a corresponding resistor when the button key is operated. When the button key is operated, the voltage output via the microphone contact is varied according to the resistances allocated to the respective keys. The mobile device detects an output voltage of the microphone contact via the ADC, and identifies the operated key based on the detected level of voltage. However, when conventional 4-pole headphones additionally include button keys for controlling a variety of functions, the button type operating unit must be accordingly large in size. In addition, conventional 4-pole headphones have a limited ability for detecting types of button keys via the level of voltage output from the microphone contact.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide headphones with a touch input unit that is designed to detect a one-dimensional coordinate via only one Indium Tin Oxide (ITO) film, and also a mobile device that can allow for the connection of the headphones.

Another aspect of the present invention is to provide headphones with a touch input unit that is designed to receive a variety of user's operating signals, and also a mobile device that can allow for the connection of the headphones.

Another aspect of the present invention is to provide headphones with a touch input unit that is designed with a simple circuit for processing a user's input touches, and also a mobile device that can allow for the connection of the headphones.

In accordance with an aspect of the present invention, a headphones apparatus is provided. The apparatus includes a microphone for receiving voice signals, a left loudspeaker for outputting a left audio signal, a right loudspeaker for outputting a right audio signal, a touch input unit for receiving a user's operating signals to control a mobile device, and a plug. The plug includes a sensing contact for transmitting the operation signals from the touch input unit to the mobile device, a microphone contact connected to the microphone for supplying bias voltage to the microphone, a left audio contact connected to the left loudspeaker, a right audio contact connect to the right loudspeaker, and a ground contact.

In accordance with another aspect of the present invention, a mobile device which allows for the connection to headphones having a touch input unit for receiving a user's operation signal is provided. The mobile device includes an ear jack and controller. The ear jack accepts a plug of the headphones, and includes a signal receiving contact for receiving the user's operation signal from the touch input unit, a detection contact connected to a ground contact of the plug, a microphone contact supplying microphone bias voltage and receiving voice signals, a ground contact connected to the ground, a right audio contact for transmitting right audio signals to the headphones, and a left audio contact for transmitting left audio signals to the headphones. The controller detects whether the ear jack accepts the plug of the headphones. The controller also receives the user's operation signal via the signal receiving contact. The controller performs a function corresponding to the received user's operation signal.

In accordance with another aspect of the present invention, a system is provided. The system includes a headphones apparatus comprising a left loudspeaker, a right loud speaker, a touch input for receiving a user's operating signals, and a plug for transmitting and receiving signals, and a mobile device comprising an ear jack for interfacing with the plug so as to receive the operating signals, and a controller for analyzing characteristics of the operating signals and for determining a desired operation of the mobile device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which:

FIG. 4 illustrates a circuit diagram of headphones and a mobile device connected thereto, according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the invention to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
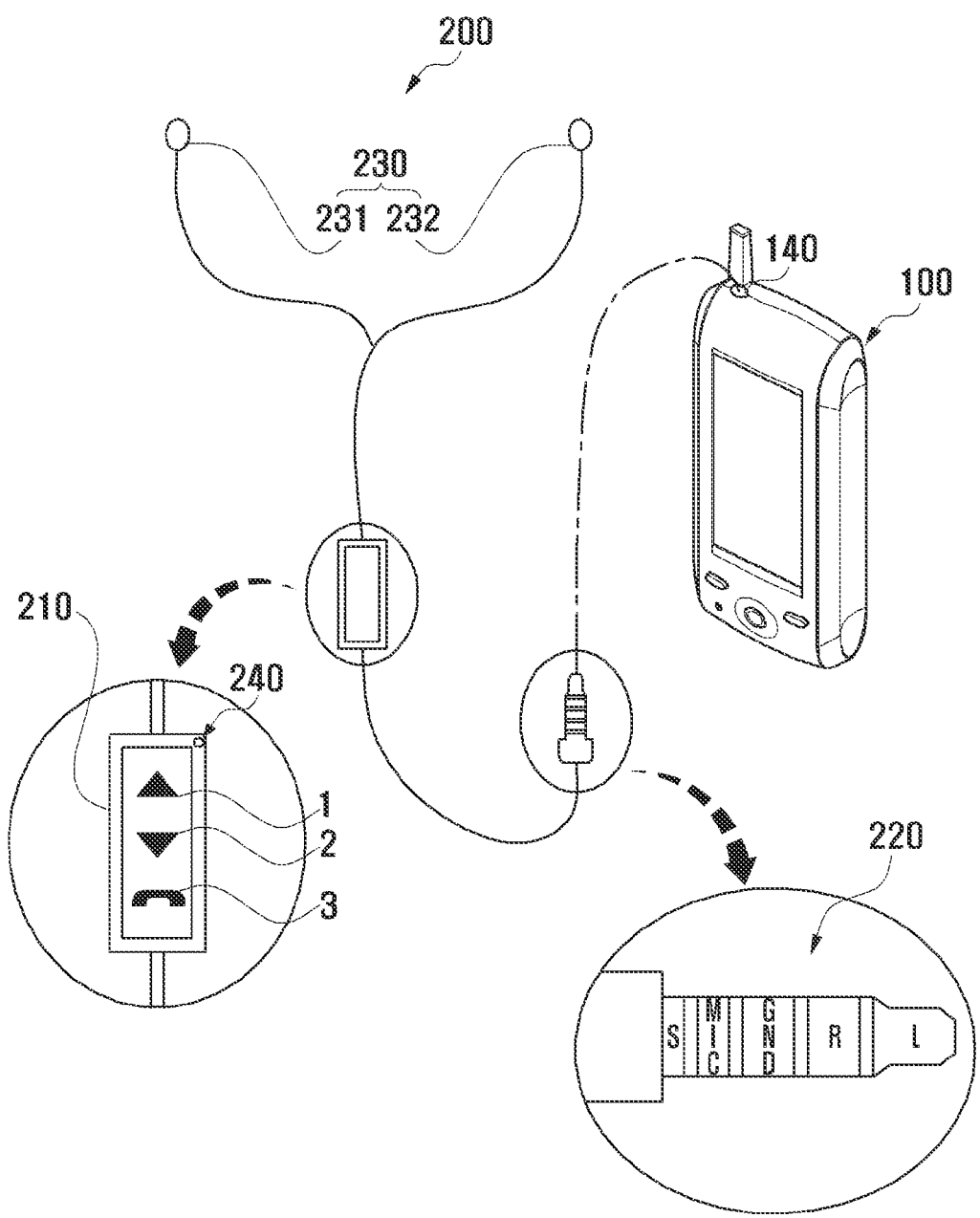
FIG. 1 illustrates headphones with a touch input unit and a mobile device according to an exemplary embodiment of the present invention.

FIG. 1 illustrates headphones with a touch input unit and a mobile device according to an exemplary embodiment of the present invention.

Referring to FIG. 1, the mobile device 100 includes an ear jack 140 that accepts a plug 220 of headphones 200. The mobile device 100 illustrated in FIG. 1 includes an ear jack 140 disposed on one side, however, the present invention is not limited thereto. The mobile device 100 outputs/receives signals to/from the headphones 200 via the ear jack 140. For example, the signals may be audio signals. The signals may also include signals relating to an audio signal output/received to/from the headphones 200 via the ear jack 140. Indeed, the mobile device 100 also receives operation signals from a touch input unit 210 of the headphones 200 via the ear jack 140 and thus performs functions corresponding to the received signals. For example, if the mobile device 100 receives a volume up signal, as an operation signal, from the touch input unit 210, then the mobile device 100 increases the volume. If the mobile device 100 receives a volume up signal, the mobile device 100 may increase only the volume of the audio signal being output from the mobile device 100 to the headphones 200.

The headphones 200 includes a microphone 240, a couple of loudspeakers 230, a touch input unit 210, and a plug 220. The microphone 240 receives audio sounds. For example, the microphone 240 may receive audio from its surrounding environment and generate a representative electric signal based on the received audio. The loudspeakers 230 output audio signals. The loudspeakers 230 are divided into a right loudspeaker 231 and a left loudspeaker 232.

The plug 220 includes left L and right R audio contacts, a ground contact GND, a microphone contact MIC, and a sensing contact S. The left L and right R audio contacts communicate left and right audio signals respectively between the headphones 200 and the mobile device 100. For example, the left L and right R audio contacts may receive audio signal signals respectively from the mobile device 100. The left L and right R audio contacts may also transmit audio signals respectively to the mobile device 100. The ground contact GND is connected to the ground of the mobile device 100. Although it is not shown, when the headphones 200 serve as an antenna for receiving FM radio signals or broadcast signals, the ground contact GND can transfer FM radio signals or broadcast signals to the mobile device 100. The microphone contact MIC transfers audio signals, which are output from a microphone 240 of the headphones 200, to the mobile device 100. The sensing contact S is connected to the touch input unit 210, and transfers operation signals according to a gesture to the mobile device 100. The operation signals may be, for example a touch, a long touch, a touch movement, etc. As shown in FIG. 1, although the exemplary embodiment of the plug 220 according to the present invention is illustrated so as to further include the sensing contact S in a 4-pole plug, it should be understood that the present invention is not limited to the embodiment. For example, the exemplary embodiment of the plug 220 according to the present invention may be modified in various ways allowing for a variety of installation methods with the sensing contact S.

The touch input unit 210 allows the user to create the operation signals for controlling the mobile device 100. For example, operation signals may be touch signals. The touch input unit 210 is divided into a number of areas for controlling a variety of functions according to touch signals. For the sake of convenient use, the touch input unit 210 shows marks printed on the divided areas that are related to functions to be executed according to the user's touches. For example, as shown in FIG. 1, the touch input unit 210 shows a first mark 1 representing a volume up key, a second mark 2 representing a volume down, and a third mark 3 representing a call key. It should be understood that the invention is not limited to such an exemplary embodiment. For example, the marks may be printed on the touch input unit 210 in various shapes according to the manufactures' designs. Alternatively, the touch input unit 210 may be implemented with no marks. In addition, although the embodiment of the touch input unit 210 is divided into three areas, it should be understood that the invention is not limited to the embodiment. For example, the touch input unit 210 may be divided into two or more areas, and they may be allocated with various functions according to the manufacturers' designs.

The touch input unit 210 may create a variety of operation signals according to the touch movement (e.g., the touch speed, the touch location, the movement of the touch, etc.) and may transfer the various operation signals to the mobile device 100. For example, if the user moves the touch in the first direction (from mark 1 to mark 3 illustrated in FIG. 1) at a speed less than a preset speed while the mobile device 100 is playing back a music file in a playlist, then the mobile device 100 plays back the next music file. In contrast, if the user moves the touch in the second direction (from mark 3 to mark 1 illustrated in FIG. 1) at a speed less than a preset speed while the mobile device 100 is playing back a music file in a playlist, then the mobile device 100 plays back the previous music file. Likewise, if the user moves the touch in the first direction at a speed equal to or greater than a preset speed while the mobile device 100 is playing back a music file in a playlist, then the mobile device 100 increase the speed at which the mobile device 100 plays back the music file. In contrast, if the user moves the touch in the second direction at a speed equal to or greater than a preset speed while the mobile device 100 is playing back a music file in a playlist, the mobile device 100 reduces the speed at which the mobile device 100 plays back the music file. The touch input unit 210 may be implemented with a resistance film. In an exemplary embodiment of the present invention, the touch input unit is designed to include only one Indium Tin Oxide (ITO) film, and detects a one-dimensional coordinate. This configuration does not require an addition Integrated Circuit (IC) chip for processing touches, and thus the touch input unit 210 can be implemented with a simple circuit. Consequently, such a configuration of the touch input unit 210 reduces the manufacturing costs of the headphones 200. The touch input unit 210 is described in detail referring to FIGS. 2 and 3.

Figure 2:
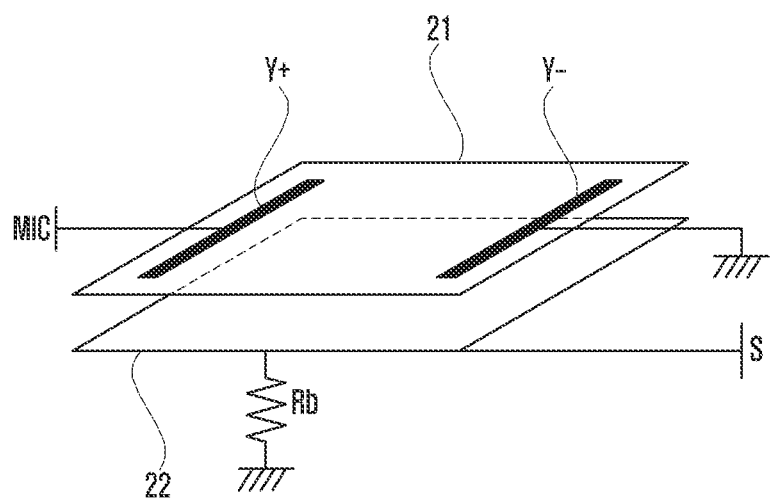
FIG. 2 illustrates a configuration of a touch input unit according to an exemplary embodiment of the present invention.
Figure 3A:
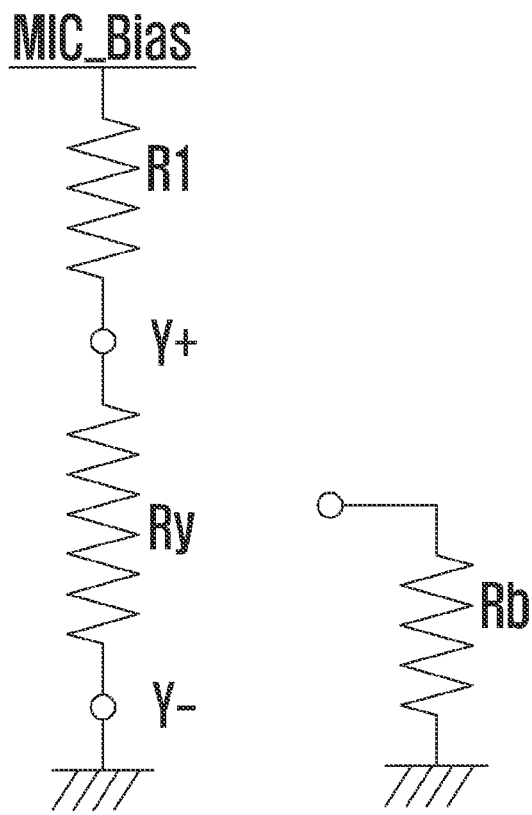
FIGS. 3A and 3B illustrate equivalent circuits that describe the principle of the operation of the touch input unit according to an exemplary embodiment of the present invention.
Figure 3B:
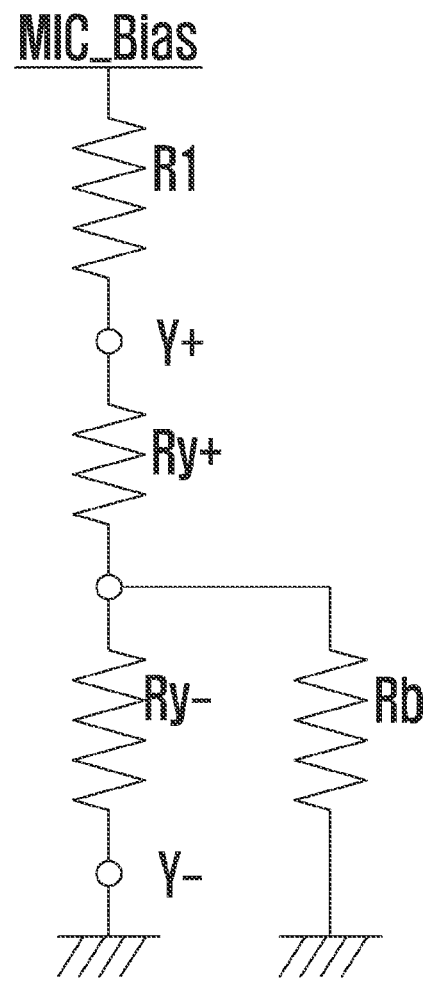

FIG. 2 illustrates a configuration of a touch input unit 210 according to an exemplary embodiment of the present invention. FIGS. 3A and 3B illustrate equivalent circuits that describe the principle of the operation of the touch input unit according to an exemplary embodiment of the present invention.

Referring to FIG. 2, the touch input unit 210 includes a resistance film layer 21 and a conductive layer 22.

The resistance film layer 21 is implemented with an Indium Tin Oxide (ITO) film which is coated with resistive components. The resistance film layer 21 includes a positive electrode Y+ which receives electric power and a negative electrode Y− which is grounded to the earth. The positive electrode Y+ and the negative electrode Y− may be formed at opposing ends of the resistance film layer 21. The positive electrode Y+ is connected to the microphone contact MIC of the plug 220. If the plug 220 of the headphones 200 is connected to the ear jack 140 of the mobile device 100, the positive electrode Y+ receives a microphone bias voltage (i.e., MIC-Bias) via the microphone contact MIC.

The conductive layer 22 is implemented with a conductive metal film. The conductive layer 22 is connected to the sensing contact S of the plug 220. The conductive layer 22 contacts one side of the resistance film layer 21 when the user applies a touch to the touch input unit 210. For example, the touch input 210 is configured such that the conductive layer 22 contacts one side of the resistance film layer 21 if the user applies a downward force (e.g., having a force component that is perpendicular to the surface of the conductive layer 22) to the touch input unit 210. The conductive layer 22 is connected to a pull-down resistor having a resistance Rb to prevent the floating of the sensing contact S.

When a touch does not occur on the touch input unit 210, the touch input unit 210 is expressed as the equivalent circuit illustrated in FIG. 3A. The positive electrode Y+ receives the microphone bias voltage MIC_Bias from the mobile device 100. Meanwhile, the positive electrode Y+ is connected to the negative electrode Y− via a film resistor having a resistance Ry. The sensing contact S is grounded via a pull-down resistor having a resistance Rb.

If a touch occurs on the touch input unit 210 and thus if the resistance film layer 21 at least partially contacts the conductive layer 22, the touch input unit 210 is expressed as the equivalent circuit illustrated in FIG. 3B. In that case, the sensing contact S receives a sensed voltage Vs which is expressed as the following Equation (1).

$$Vs = Vmic\_bias \times [(Ry-//Rb)/\{(Ry-//Rb)+(Ry+)+R1\}] \quad \text{Equation 1}$$

where Vmic_bias denotes microphone bias voltage applied to the microphone 240 from the mobile device 100. R1 denotes a resistance of a pull-up resistor which is installed to the mobile device 100. Ry+ denotes a resistance created when a touch occurs on the resistance film layer 21 between the positive electrode Y+ and the touch point. Similarly, Ry− denotes a resistance created when a touch occurs on the resistance film layer 21 between the negative electrode Y− and the touch point. The Ry+ and Ry− vary depending on the touch point. (Ry−//Rb) denotes a combined resistance of Ry− and Rb connected in parallel. Because the method of calculating the combined resistance is well-known to the ordinary person in the art, its description will be omitted in this application. The sensed voltage Vs is output to the mobile device 100 via the sensing contact S. Accordingly, the mobile device 100 can detect the touch point via the sensed voltage Vs.

FIG. 4 illustrates a circuit diagram of headphones and a mobile device connected thereto, according to an exemplary embodiment of the present invention.

Referring to FIGS. 1 to 4, the headphones 200 includes a touch input unit 210, a plug 220, loudspeakers 230 and a microphone 240. The mobile device 100 includes an audio processing unit 160, an ear jack 140, a display unit 130, a storage unit 120, and a controller 110.

The touch input unit 210 transfers operation signals to the mobile device 100. The operation signals may be signals according to a user's gestures (e.g., types of touches, a touch movement direction, a speed of touch movement, etc.). Because the configuration of the touch input unit 210 has been described in detail above referring to FIGS. 1 to 3, the following description is provided regarding the touch states in the touch input unit 210 referring to FIG. 4.

The loudspeakers 230 output audio signals transferred from the mobile device 100. The loudspeakers 230 are divided into the right loudspeaker 231 and left loudspeaker 232. The right loudspeaker 231 is operatively connected to the right audio contact R of the plug 220 and outputs right audio sounds. Likewise, the left loudspeaker 232 is operatively connected to the left audio contact L of the plug 220 and outputs left audio sounds.

The microphone 240 receives audio such as voices from the outside (e.g., from the environment surrounding the microphone 240) and transfers the audio signals to the mobile device 100 via the microphone contact MIC. The microphone 240 has a positive port that is connected to the positive electrode Y+ of the touch input unit 210. In that case, the touch input unit 210 receives the microphone bias voltage MIC_Bias via the positive electrode Y+.

The plug 220 is an interface that is configured to connect to the mobile device 100. For example, the plug 220 is an interface for interfacing with the ear jack 140 so as to facilitate connection with the mobile device 100. The plug 220 includes a microphone contact MIC, a ground contact GND, a right audio contact R, a left audio contact L and a sensing contact S. Because the plug 220 has been already described in detail above referring to FIG. 1, its detailed description will be omitted in the following description.

The ear jack 140 is an interface for connecting with the headphones 200. For example, the ear jack 140 is an interface for interfacing with the plug 220 so as to facilitate connection with the headphones 200. The ear jack 140 includes microphone contact MIC, a ground contact GND, a right audio contact R, a left audio contact L, a signal receiving contact S, and a detection contact DET for detecting whether the ear jack 140 accepts the plug 220 of the headphones 200. As an example, the detection contact DET enables the mobile device 100 to determine whether the ear jack 140 is connected to (i.e., interfacing with) the plug 220 of the headphones 200.

The signal receiving contact S of the ear jack 140 is connected to a port of a first analog to digital converter ADC1. The ground contact GND of the ear jack 140 is grounded. The right R and left L audio contacts of the ear jack 140 are respectively connected to right R and left L audio output ports of the audio processing unit 160. When the headphones 200 serve as an antenna for receiving FM radio signals or broadcast signals, the ground contact GND of the headphones 200 may be selectively connected to a broadcast receiving module (not shown) or an FM radio reproducing module (not shown).

The detection contact DET is connected to a second resistor R2 as a pull-up resistor. If the ear jack 140 is not connected to the plug 220 of the headphones 200, then the detection contact DET is in a floating state. Conversely, if the ear jack 140 accepts the plug 220 of the headphones 200, then the detection contact DET is grounded.

The microphone contact MIC of the ear jack 140 is connected to the microphone bias voltage MIC_Bias for driving the microphone 240 of the headphones 200. As described above, there is a first resistor R1 as a pull-up resistor between the microphone bias voltage MIC_Bias and the microphone contact MIC. The microphone contact MIC of the ear jack 140 is connected to a port of a second analog to digital converter ADC2 and the microphone input port L of the audio processing unit 160.

The audio processing unit 160 transmits/receives audio signals and encodes/decodes audio data. The audio processing unit 160 includes CODECS, amplifiers, etc. The audio processing unit 160 is connected to a microphone 161 and a loudspeaker 162 installed to the mobile device 100. The audio processing unit 160 receives analog audio signals (e.g., voice signals) via the microphone 161 of the mobile device 100 or the microphone 240 of the headphones 200, converts the analog signals into digital signals, and transfers the digital signals to the controller 110. The audio processing unit 160 also converts digital audio signals output from the controller 110 into analog audio signals, and outputs the analog signals to the speaker 162 of the mobile device 100 or to the loudspeakers 230 of the headphones 200. The audio processing unit 160 can also output audio signals, which are created in the mobile device 100, to the speaker 162 of the mobile device 100 or to the loudspeakers 230 of the headphones 200. For example, the audio processing unit 160 outputs audio signals, which are created when the mobile device 100 plays back files (e.g., MP3 files, video files, or the like), to the loudspeaker 162 of the mobile device 100 or to the loudspeakers 230 of the headphones 200. To this end, the audio processing unit 160 includes a microphone input port MIC, a right audio output port R and a left audio output port L.

The display unit 130 displays menus, user's input information, and information provided to the user. The display unit 130 displays various types of screens (e.g., an idle screen, a message writing screen, a call screen, etc). The display unit 130 also displays, on the indicator area, an RSSI icon, an alarm icon, a battery meter icon, and an icon indicating the connection with the headphones 200. The display unit 130 can display screens when functions are executed that correspond to operation signals transferred from the touch input unit 210. For example, if the mobile device 100 receives a call request signal from the touch input unit 210, then the display unit 130 displays the call requesting screen. The display unit 130 may be implemented with a Liquid Crystal Display (LCD), an Organic Light Emitting Diode (OLED), an Active Matrix Organic Light Emitting Diodes (AMOLED), or the like. If the display unit 130 is implemented with a touch screen, then it may also serve as an input device.

The storage unit 120 stores programs required for controlling the operations and functions according to exemplary embodiments of the present invention. For example, the storage unit 120 stores an operating system (OS) for booting the mobile device 100 and for controlling the entire operation of the mobile device 100. The storage unit 120 also stores application programs for optional functions (e.g., a camera function, an audio file playback function, an image/video playback function, a short-range RF communication function, etc.). In addition, the storage unit 120 stores data created when the application programs are executed, and user's input data. Examples of the user's data include text messages, game files, audio files, movie files, etc. In an exemplary embodiment of the present invention, the storage unit 120 stores a table (e.g., a mapping table) in which operation signals transferred from the touch input unit 210 are mapped to corresponding functions. An example of the mapping table is shown in the following table 1.

TABLE 1

| Vs [Volt] | | Idle state | Music playback | Calling state |
|---|---|---|---|---|
| $0 < Vs \leq 0.7$ | | Call request | Playback/Stop | Call termination |
| $0.7 < Vs \leq 1.4$ | | Volume down | Volume down | Volume down |
| $1.4 < Vs \leq 2$ | | Volume up | Volume up | Volume up |
| Touch 1$^{st}$ Dir. | Speed < Ref. speed | Music playback | Next music | Call recording |
| | Ref. speed ≤ Speed | X | Increase playback speed | X |
| Touch 2$^{nd}$ Dir. | Speed < Ref. speed | Broadcast playback | Previous music | X |
| | Ref. speed ≤ Speed | X | Reduce playback speed | X |
| | ... | ... | ... | ... |

Referring to Table 1, the operation signals according to type of touches and the touch movement are mapped to corresponding functions. The functions corresponding to the operation signals may vary according to the states of the mobile device 100. For example, if the mobile device 100 in an idle state receives an operation signal of voltage, $0<Vs\leq0.7$, from the touch input unit 210, then the mobile device 100 can perform a call request function. If the mobile device 100 receives an operation signal of voltage, $0<Vs\leq0.7$, from the touch input unit 210 while an audio playback program is being executed, then the mobile device 100 can play back/stop the audio file. Table 1 is an example of the mapping table according to an exemplary embodiment of the present invention. Thus, it should be understood that the present invention is not limited to the example. For example, although the mapping table provided in Table 1 has three fields, the mapping table may be modified to include one or more fields. Also, although the mapping table provided in Table 1 shows three states, (i.e., an idle state, a music playback state, and a calling state), the mapping table may further include a variety of states (e.g., a broadcast playback, a gaming state, etc.). In another exemplary embodiment of the present invention, the storage unit 120 may provide a menu allowing the user to alter the mapping table. Accordingly, the user can edit the mapping table by altering functions mapped to the user's operated signals, and adding/deleting the user's operated signals.

The controller 110 controls the entire operation of the mobile device 100 and the signals flowing among the components in the mobile device 100. The controller 110 includes a headphone detection port Ear_detect which is connected to the detection contact DET of the ear jack 140. The headphone detection port Ear_detect is provided for detecting whether the ear jack 140 is connected to the plug 220 of the headphones 200. The controller 110 also includes a first analog to digital converter ADC1 which is connected to the signal receiving contact S of the ear jack 140. The first analog to digital converter ADC1 is provided for receiving operation signals from the touch input unit 210. The controller 110 also includes a second analog to digital converter ADC2 which is connected to the microphone contact MIC of the ear jack 140.

In an exemplary embodiment of the present invention, the headphone detection port Ear_detect may be implemented with a GPIO (e.g., a General Purpose Input/Output). The headphone detection port Ear_detect is connected to a second resistor (R2) as a pull-up resistor. If the controller 110 receives a high level of signal (e.g., 3 V) a voltage source VDD via the headphone detection port Ear_detect, then the controller 110 detects that the ear jack 140 is not connected to the headphones 200. In contrast, if the detection contact DET of the ear jack 140 is connected to the ground contact GND of the headphones 200, then the controller 110 receives a low level of signal (e.g., 0 V) via the headphone detection port Ear_detect, and thus the controller 110 determines that the ear jack 140 is connected to the headphones 200.

The first analog to digital converter ADC1 is a device that coverts analog signals to digital signals. For example, the first analog to digital converter ADC1 converts analog signals, received via the signal receiving contact point S of the ear jack 140, into digital signals. The controller 110 detects the user's touch point on the touch input unit 210 via the digital signal converted by the first analog to digital converter ADC1, and performs a function corresponding to the user's touch gesture. If the controller 110 detects that the touch point varies on the touch input unit 210, then the controller 110 determines that the user performs a touch movement gesture. In that case, the controller 110 detects characteristics of the user's input (e.g., the user's touch) to the touch input unit 210. For example, the controller 110 detects the movement direction of the touch and the time between the touch and the touch release, and calculates the touch movement speed. After such detection, the controller 110 identifies an operation signal referring to the mapping table (e.g., Table 1), and thereafter performs the corresponding function.

According to an exemplary embodiment of the present invention, the controller 110 detects a time that the touch has been retained without movement (or the variation of the coordinates, i.e., a voltage) since the touch occurs on the touch input unit 210, and then compares it with a first preset time. If the controller 110 ascertains that the detected time is equal to or greater than the first preset time, the controller 110 determines that the touch is a long touch. The controller 110 can identify the movement of the touch between the first and second directions. For example, when the controller 110 detects that the level of voltage increases that is input to the first analog to digital converter ADC1, the controller 110 determines that the touch moves in the first direction. Conversely, if the controller 110 detects that the level of voltage decreases, the controller 110 determines that the touch moves in the second direction. The controller can detect a time from the touch to the touch release and compare the detected time with a second preset time. If the controller 110 ascertains that the detected time is equal to or less than the second preset time, the controller 110 determines that the touch speed is equal to or greater than a reference speed. In contrast, if the controller 110 ascertains that the detected time is greater than the second preset time, the controller 110 determines that the touch speed is less than a reference speed.

The second analog to digital converter ADC2 is connected to the microphone contact MIC of the ear jack 140. The second analog to digital converter ADC2 detects operation signals created by conventional 4-pole headphones with button keys. The detection by the second analog to digital converter ADC2 is well-known to the ordinary person skilled in the art. Therefore, its detailed description is omitted in the application. The headphones according to exemplary embodiments of the present invention include a second analog to digital converter ADC2 that is compatible with conventional 4-pole headphones, and thus may be implemented without them.

Although it is not shown in FIG. 4, the mobile device 100 may selectively further include units having add-on functions as follows: a camera module; a broadcast module for receiving and reproducing broadcasts; an audio source playback module, such as an MP3 module; a short-range RF communication module; a proximity sensor; etc. With the spread of digital convergence, although mobile devices vary too greatly to list the mobile device modifications in this description, it will be easily appreciated by those skilled in the art that the other units equivalent to the above-listed units may be further included in the Bluetooth device of the invention.

As described above, the headphones with a touch input unit according to exemplary embodiments of the present invention allow the user to input a variety of operation signals to the mobile device, compared with conventional headphones having a button type operating unit. Accordingly, the user can easily operate the mobile device via the touch input unit.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A headphones apparatus, the apparatus comprising:
    a microphone for receiving audio signals;
    a left loudspeaker for outputting a left audio signal;
    a right loudspeaker for outputting a right audio signal;
    a touch input unit for receiving a user's operating signals; and
    a plug comprising a sensing contact for transmitting the operating signals from the touch input unit to the mobile device, a microphone contact connected to the microphone for supplying bias voltage to the microphone, a left audio contact connected to the left loudspeaker, a right audio contact connect to the right loudspeaker, and a ground contact,
    wherein the touch input unit comprises:
        a resistance film layer coated with resistance components; and
        a conductive layer connected to the sensing contact, and wherein the conductive layer contacts one side of the resistance film layer when a touch occurs.

2. The apparatus of claim 1, wherein the resistance film layer comprises:
   a positive electrode connected to the microphone contact, wherein the positive electrode is located at one end portion of the resistance film layer; and
   a negative electrode grounded to the earth, wherein the negative electrode is located opposite the positive electrode.

3. The apparatus of claim 2, wherein the negative electrode is located at an end portion of the resistance film layer that is opposite to that at which the positive electrode is located.

4. The apparatus of claim 1, further comprising:
   a pull-down resistor connected to the conductive layer for preventing the floating of the sensing contact.

5. The apparatus of claim 1, wherein the touch input unit comprises:
   at least one mark representing a corresponding function when the touch occurs.

6. The apparatus of claim 1, wherein the operation signals are created by user's gestures that comprise at least one of the touch, a long touch, a touch moving in a first direction at a speed less than a preset value, a touch moving in a second direction at a speed less than the preset value, a touch moving in the first direction at a speed equal to or greater than the preset value, and a touch moving in the second direction at a speed equal to or greater than the preset value.

7. The apparatus of claim 1, wherein the user's operating signals correspond to signals that control the mobile device.

8. A mobile device allowing for the connection to headphones that comprises a touch input unit for receiving a user's operating signal, the mobile device comprising:
   an ear jack for accepting a plug of the headphones, the ear jack comprising:
      a signal receiving contact for receiving the user's operating signal from the touch input unit;
      a detection contact connected to a ground contact of the plug; a microphone contact supplying microphone bias voltage and receiving audio signals; a ground contact connected to the ground;
      a right audio contact for transmitting right audio signals to the headphones; and
      a left audio contact for transmitting left audio signals to the headphones; and
   a controller for detecting whether the ear jack accepts the plug of the headphones, for receiving the user's operating signal via the signal receiving contact, and for performing a function corresponding to the received user's operating signal,
   wherein the touch input unit comprises:
      a resistance film layer coated with resistance components; and
      a conductive layer connected to the sensing contact, and
   wherein the conductive layer contacts one side of the resistance film layer when a touch occurs.

9. The mobile device of claim 8, wherein the controller comprises:
   a headphones detection port connected to the detection contact of the ear jack and to a pull-up resistor.

10. The mobile device of claim 9, wherein the controller comprises:
   a second analog to digital converter connected to the microphone contact of the ear jack.

11. The mobile device of claim 8, wherein the controller comprises:
   a first analog to digital converter connected to the signal receiving contact of the ear jack.

12. The mobile device of claim 11, wherein the controller identifies whether the touch moves in a first or second direction via the alteration in a level of voltage input to the first analog to digital converter.

13. The mobile device of claim 8, wherein, when the touch is retained for a time equal to or greater than a first preset time, the controller determines that the touch is a long touch.

14. The mobile device of claim 8, wherein the controller detects a time from the touch to the touch release and determines whether the touch speed is equal to or greater than a preset value via the detected time.

15. The mobile device of claim 8, further comprising:
   a storage unit for storing a table in which the operation signals are mapped to functions.

16. The mobile device of claim 15, wherein the storage unit stores a menu for altering the mapping table.

17. A system comprising:
   a headphones apparatus comprising a left loudspeaker, a right loud speaker, a touch input for receiving a user's operating signals, and a plug for transmitting and receiving signals; and
   a mobile device comprising an ear jack for interfacing with the plug so as to receive the operating signals, and a controller for analyzing characteristics of the operating signals and for determining a desired operation of the mobile device,
   wherein the touch input comprises:
      a resistance film layer coated with resistance components; and
      a conductive layer connected to the sensing contact, and
   wherein the conductive layer contacts one side of the resistance film layer when a touch occurs.

18. The system of claim 17, wherein the characteristics of the operating signals includes an amount of time the touch input is touched, a movement of the touch when the touch input is touched, a speed of movement of a touch when the touch input is touched.

19. The system of claim 18, wherein the mobile device further comprises a storage unit for storing a table in which the operation signals are mapped to functions.

* * * * *